May 18, 1948.  R. E. ANDERSON  2,441,551
WELDING TOOL
Filed March 8, 1946
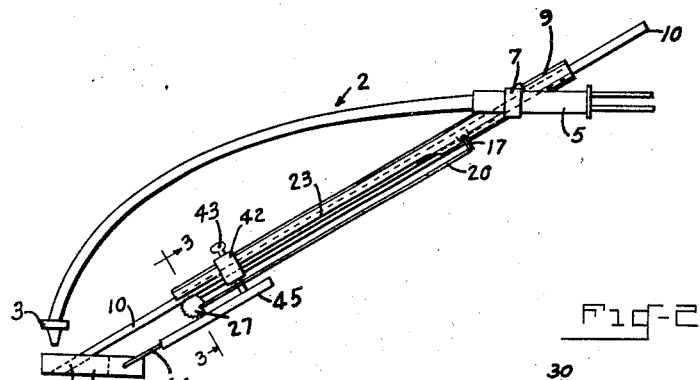
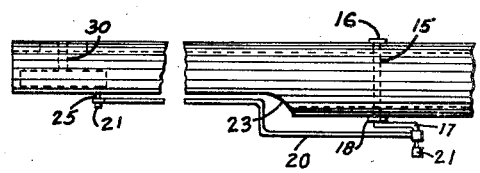
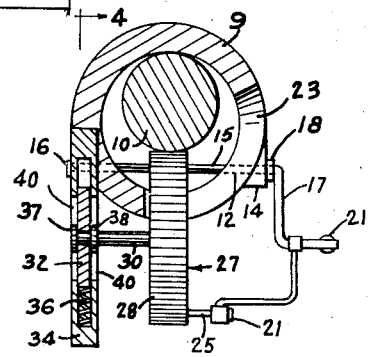
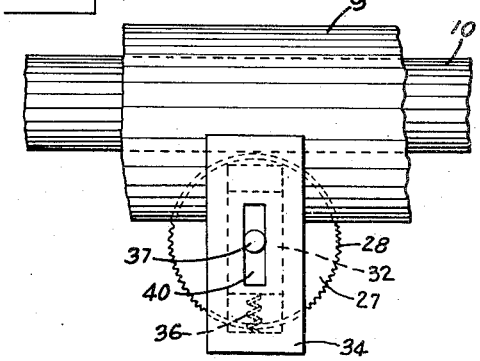
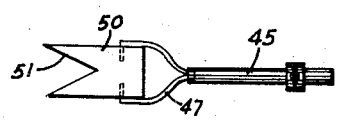
INVENTOR.
Robert E. Anderson
BY Patented May 18, 1948

2,441,551

UNITED STATES PATENT OFFICE 2,441,551

WELDING TOOL

Robert E. Anderson, Champaign, Ill.

Application March 8, 1946, Serial No. 653,114

1 Claim. (Cl. 219—8)

The instant invention relates to improvements in welding tools.

The main object of my invention is to provide an attachment adapted for easy and quick connection to an ordinary gas welding torch or electric welder.

Another object is to provide an attachment for feeding the welding rod that will enable the operator to make a smooth weld not in need of being grounded and to thus save the cost of abrading and to reduce the cost of the welding rod.

A further object is to provide an attachment saving time and of simple, durable and economical construction.

Still another object is to provide an attachment of the class characterized and including welding rod feeding means operable by a thumb of the hand holding the attachment.

With these and other objects and advantages in view the invention resides in the novelty of construction, combination and arrangement of elements hereinafter specifically described and distinctly claimed in the appended claim.

The description should be read in connection with the accompanying drawing forming part of the application and wherein:

Figure 1 is a side elevation of the preferred embodiment of my invention.

Figure 2 is an enlarged detail top plan view of the intermediate part of the main rod and the manual means carried thereby for feeding the welding rod.

Figure 3 is a still more enlarged transverse section on line 3—3 of Figure 1.

Figure 4 is a detail side view taken from the left side of Figure 3.

Figure 5 is an enlarged detail top plan view of a carbon holder.

In the drawing, numeral 2 denotes a conventional welding torch including a nozzle 3 at the front end and hand grip 5 adjacent the rear end. A clamp or other connection 7 is attached forwardly of the grip and to the rear end portion of a tubular main rod 9 which terminates forwardly short of the nozzle.

A pencil or welding rod 10 preferably of metal composition extends through the tube 9 and has a forward end disposed in close proximity to and beneath the nozzle 3.

The lower half of the rear portion of the main rod 9 is provided with a pair of transverse registering journal openings 12 and bosses 14 each adjacent an opening.

A shaft 15 is journalled in the openings and terminates at one end in a head 16 and carries at the other end a crank 17 spaced from the main rod by a washer or collar 18.

The part of the crank 17 extending parallel to the shaft 15 is a journal for the rear end of a rod 20 and carries upon its free end an enlargement 21 to prevent the separation of the rod 20 from the crank 17. The forward part of the rod 20 is offset with respect to the rear part and disposed in a cut-out groove 23 formed in the confronting half of the main rod 9 and journalled at its forward end upon a pin 25. The pin 25 extends eccentrically and laterally from the confronting face of a feed wheel 27 partially disposed in the main rod 9 and cut-out 23.

The feed wheel 27 carries upon its periphery a series of teeth or serrations 28 which engage the welding rod 10 in the main rod 9. The feed wheel is supported by a shaft 30 extending from its other face and journalled in a bearing plate 32 which is slidably mounted within a support 34. The support 34 fits and is secured with its upper end in a recess formed in a side of the main rod 9 and partly encloses a spring 36 which supports with its upper end the bearing plate 32. The plate 32 is secured against axial displacement upon its shaft by the latter's head 37 and collar 38. The two last mentioned parts slide within slots 40 formed in confronting walls of the hollow plate support 34.

A clamp 42 is slidably mounted upon the main rod 9 and may be fixed thereon by a set screw 43. The clamp structure has been omitted in Figure 3 and carries at its lower end extending below the main rod 9 a holding rod 45 projecting forwardly. The holding rod can be detached easily from the rest of the structure and turned in different directions.

In the forward end of the holding rod is formed a socket receiving the rear end of a fork-like holder 47, the forwardly extending resilient prongs of which have inwardly bent parts seated in sockets. Each socket is formed in one of the opposing sides of a piece of carbon 50 having a notch 51 in its front edge and forming a variable angle with the fork. The carbon is used when it is desired to preheat the work.

The carbon piece 50 may be replaced by another piece of a different shape to fit the job at hand. Approximately five differently shaped pieces will fit all welding positions. The carbon piece smoothes the melting metal from the welding rod. The carbon piece may be fed by the feed mechanism described and operable by the thumb of the hand gripping the torch.

This attachment can be used on a soldering iron for smoothing out soft metals such as solder and lead and also as a steady rest on a cutting torch. The attachment is designed to operate with ease and efficiency in places where the old methods are useless.

This attachment can be used on an electric welder by holding it in one hand and moving it behind the metal to be welded.

The controlled feeding of the welding rod and the movement of the carbon piece produce a smooth weld that is not in need of being ground off. Thus the cost of grinding is saved and the cost of the welding rod is cut in half and valuable time is saved.

From the foregoing description the construction of my improved device and the operation thereof will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

What I claim and desire to protect by Letters Patent of the United States is as follows:

The combination, with a welding torch having a hand grip, of an attachment comprising a tubular main rod connectible to the torch forwardly of the hand grip, a feed wheel resiliently supported by the main rod for feeding a welding rod guided within the main rod, a carbon holder supported by the main rod, and means for adjusting the position of the carbon holder with respect to the welding rod.

ROBERT E. ANDERSON.

REFERENCES CITED

The following references are of record in the file of this patent:

UNITED STATES PATENTS

| Number | Name | Date |
| --- | --- | --- |
| 1,514,492 | Wille et al. | Nov. 4, 1941 |
| 2,329,904 | Howard | Sept. 21, 1943 |
| 2,390,149 | Hopper | Dec. 4, 1945 |

FOREIGN PATENTS

| Number | Country | Date |
| --- | --- | --- |
| 143,331 | Great Britain | May 27, 1920 |